(12) United States Patent
Naumann et al.

(10) Patent No.: US 10,859,470 B2
(45) Date of Patent: Dec. 8, 2020

(54) METHOD FOR MEASURING AND CALCULATING GEOMETRIC PARAMETERS OF THE WHEELS OF A WHEELSET FOR RAIL VEHICLES

(71) Applicant: HEGENSCHEIDT-MFD GmbH, Erkelenz (DE)

(72) Inventors: Hans J. Naumann, Chemnitz (DE); John Oliver Naumann, Wassenberg (DE)

(73) Assignee: HEGENSCHEIDT-MFD GmbH & CO. KG, Erkelenz (DE)

( * ) Notice: Subject to any disclaimer, the term of this patent is extended or adjusted under 35 U.S.C. 154(b) by 109 days.

(21) Appl. No.: 16/085,770

(22) PCT Filed: Mar. 17, 2016

(86) PCT No.: PCT/DE2016/000132
§ 371 (c)(1),
(2) Date: Dec. 19, 2018

(87) PCT Pub. No.: WO2017/157358
PCT Pub. Date: Sep. 21, 2017

(65) Prior Publication Data
US 2019/0353562 A1    Nov. 21, 2019

(51) Int. Cl.
*G01M 17/10*     (2006.01)
*B23B 5/28*      (2006.01)
(Continued)

(52) U.S. Cl.
CPC ............... *G01M 17/10* (2013.01); *B23B 5/28* (2013.01); *G01B 5/201* (2013.01); *G01B 7/28* (2013.01); *G01B 11/24* (2013.01)

(58) Field of Classification Search
CPC .. G01M 17/02; G01M 17/022; G01M 17/021; G01M 17/027; G01M 17/025;
(Continued)

(56) References Cited

U.S. PATENT DOCUMENTS 3,667,329 A   6/1972   Dombrowski
4,798,964 A   1/1989   Schmalfuss et al.
(Continued)

FOREIGN PATENT DOCUMENTS

DE    1815689 A1    7/1970
DE    10102673 A1   7/2002
(Continued)

OTHER PUBLICATIONS

International Search Report (in English and German) and Written Opinion (in German) issued in PCT/DE2016/000132, dated Feb. 13, 2017; ISA/EP.
(Continued)

*Primary Examiner* — Andre J Allen
(74) *Attorney, Agent, or Firm* — Harness, Dickey & Pierce, P.L.C.

(57) ABSTRACT

The invention relates to a method for measuring and calculating geometric parameters of the wheels of a wheelset for rail vehicles, wherein the wheelset to be evaluated is rotatably mounted in a wheelset machine tool or in a wheelset diagnostic system and wherein measured values for profile measurement with respect to profile wear to be detected are determined during rotational motion of said wheelset. The problem addressed by the invention is to expand already available measuring methods on known wheelset machine tools and wheelset diagnostic systems in such a way that further geometric parameters can be detected and evaluated. This problem is solved in that methods for measuring and calculating the equivalent conicity and the radial run-out
(Continued)

property of a wheelset are integrated as new measurement functions, wherein solution approaches are proposed for these additional methods.

8 Claims, 3 Drawing Sheets

(51) Int. Cl.
*G01B 5/20* (2006.01)
*G01B 7/28* (2006.01)
*G01B 11/24* (2006.01)

(58) Field of Classification Search
CPC ...... G01M 17/024; G01M 1/02; G01M 1/225; G01M 17/007; G01M 17/03; G01M 17/10; G01M 1/16; G01M 1/326; G01M 3/40; G01M 7/08; G01M 17/0076; G01M 17/013; G01M 17/04; G01M 17/06; G01M 17/08; G01M 1/04; G01M 1/045; G01M 1/12; G01M 3/04; G01M 5/0091; G01M 7/02; G01M 99/00; G01M 99/002; G01B 11/24; G01B 7/26; G01B 11/25; G01B 11/14; G01B 11/16; G01B 11/167; G01B 11/22; G01B 11/245; G01B 11/2518; G01B 11/2522; G01B 17/00; G01B 17/02; G01B 17/04; G01B 21/04; G01B 21/042; G01B 21/20; G01B 21/30; G01B 3/30; G01B 7/282
USPC ............................................. 82/104; 73/146
See application file for complete search history.

(56) References Cited

U.S. PATENT DOCUMENTS

| | | | |
|---|---|---|---|
| 4,802,285 A * | 2/1989 | Ligacz | ...................... B23B 5/28 33/203.11 |
| 4,914,991 A | 4/1990 | Bathelt et al. | |
| 5,151,870 A | 9/1992 | Beebe et al. | |
| 8,243,284 B2 | 8/2012 | Studer | |
| 2008/0216621 A1 | 9/2008 | Nijssen et al. | |
| 2010/0245843 A1 | 9/2010 | Studer | |

FOREIGN PATENT DOCUMENTS

| | | | | |
|---|---|---|---|---|
| DE | 202005018753 U1 | 3/2006 | | |
| DE | 102005001220 B4 | 12/2007 | | |
| DE | 202007016469 U1 | 3/2008 | | |
| EP | 0228500 A2 | 7/1987 | | |
| EP | 0332823 A2 | 9/1989 | | |
| EP | 1978329 A1 | 10/2008 | | |
| WO | WO-2016058727 A1 * | 4/2016 | ............... B61K 9/12 | |

OTHER PUBLICATIONS

Attivissimo, F et al.: "A Railway Measurement System to Evaluate the Wheel-Rail Interaction Quality", IEEE Transactions on Intrumentation and Measurement, IEEE Service Center, Piscataway, NJ, US, vol. 56, No. 5, Oct. 1, 2007 (Oct. 1, 2007), pp. 1583-1589, XP011192296, ISSN: 0018-9456, DOI: 10.1109/TIM.2007.903583 abstract.

Han, Peng et al.: "A new binary wheel wear prediction model based on statistical method and the demonstration", WEAR, vol. 324, Oct. 5, 2007 (Oct. 5, 2007), pp. 90-99, XP029196897, ISSN: 0043-1648, DOI: 10.1016/J.WEAR.2014.11.022 paragraphs [0002], [0003], [4.1.2], [4.1.3], [0005].

* cited by examiner 751.1104

| No. | A1 | Z1 |
|---|---|---|
| 0 | 782.230 | 711.223 |
| 1 | 781.870 | 711.445 |
| 2 | 781.739 | 711.597 |
| 3 | 781.420 | 711.811 |
| 4 | 781.207 | 711.998 |
| 5 | 780.972 | 712.193 |
| 6 | 780.744 | 712.402 |
| 7 | 780.526 | 712.616 |
| 8 | 780.325 | 712.808 |
| 9 | 780.148 | 712.994 |
| 10 | 779.936 | 713.201 |
| 11 | 779.775 | 713.397 |
| 12 | 779.589 | 713.614 |
| 13 | 779.422 | 713.811 |
| 14 | 779.246 | 714.021 |
| 15 | 779.100 | 714.213 |
| 16 | 778.929 | 714.437 |
| 17 | 778.813 | 714.625 |
| 18 | 778.687 | 714.825 |
| 19 | 778.563 | 715.026 |
| 20 | 778.417 | 715.233 |
| 21 | 778.305 | 715.432 |
| 22 | 778.187 | 715.627 |
| 23 | 778.080 | 715.837 |
| 24 | 777.999 | 716.020 |
| 25 | 777.888 | 716.228 |
| 26 | 777.795 | 716.426 |
| 27 | 777.713 | 716.616 |
| 28 | 777.623 | 716.806 |

Fig. 2

| No. | A1 | B1 |
|-----|---------|---------|
| SP  | 761.385 | 0.000   |
| 0   | 0.000   | 0.000   |
| 1   | 0.000   | 3.839   |
| 2   | 0.000   | 7.674   |
| 3   | 0.001   | 11.509  |
| 4   | 0.001   | 19.186  |
| 5   | 0.000   | 23.025  |
| 6   | 0.000   | 26.867  |
| 7   | 0.000   | 30.707  |
| 8   | 0.000   | 34.548  |
| 9   | -0.002  | 38.391  |
| 10  | -0.002  | 42.233  |
| 11  | -0.002  | 46.075  |
| 12  | -0.003  | 49.916  |
| 13  | -0.004  | 53.759  |
| 14  | -0.006  | 57.604  |
| 15  | -0.006  | 61.446  |
| 16  | -0.008  | 65.294  |
| 17  | -0.010  | 69.138  |
| 18  | -0.012  | 72.980  |
| 19  | -0.011  | 76.823  |
| 20  | -0.010  | 80.663  |
| 21  | -0.011  | 84.504  |
| 22  | -0.010  | 88.350  |
| 23  | -0.010  | 92.188  |
| 24  | -0.010  | 99.870  |
| 25  | -0.011  | 103.711 |
| 26  | -0.010  | 107.550 |
| 27  | -0.009  | 111.389 |
| 28  | -0.009  | 115.224 |
| 29  | -0.008  | 119.061 |
| 30  | -0.009  | 122.891 |

Fig. 3

METHOD FOR MEASURING AND CALCULATING GEOMETRIC PARAMETERS OF THE WHEELS OF A WHEELSET FOR RAIL VEHICLES

CROSS-REFERENCE TO RELATED APPLICATION

This application is a 371 U.S. National Stage of International Application No. PCT/DE2016/000132, filed on Mar. 17, 2016, The entire disclosure of the above application is incorporated herein by reference.

FIELD

The invention concerns a procedure for the measurement and calculation of the geometric parameters of the wheels of a wheelset for rail vehicles, with the wheelset to be assessed being positioned rotatably in a wheelset reprofiling machine or in a wheelset diagnostic system, and with measured values for a profile measurement relating to a profile wear to be detected being determined during a rotating motion.

BACKGROUND

This section provides background information related to the present disclosure which is not necessarily prior art.

Wheelsets of rail vehicles are subject to a primarily performance-dependent maintenance obligation and must therefore be regularly checked depending on their specific conditions of use and repaired if necessary. These repairs are normally performed as machining operations for re-profiling the wheels using wheelset reprofiling machines, which are known in different designs.

In this connection, mobile versions are advantageous for operational use with small vehicle fleets to be checked at different locations. For larger vehicle fleets (for instance in railway depots) permanently installed machines are primarily used.

From EP 0 332 823 A2 there is known an overhead lathe for machining a wheelset removed from a rail vehicle. DE 10 2005 001 220 B4 and DE 20 2007 016 469 U1, on the other hand, describe underfloor wheelset lathes where the wheelsets remain fitted to the rail vehicle during machining. The rail vehicle is rolled into machining position above the underfloor wheelset lathe.

Irrespective of the specific embodiment of the wheelset reprofiling machine, the geometric parameters of the wheels of a wheelset must first be determined very precisely before the actual machining can be carried out with the objective of achieving an optimum re-profiling for a further period of use. Various different solutions have already been proposed for this purpose.

Thus, DE 20 2005 018 753 U1 describes a measuring device for the geometric testing of wheelsets, by means of which the wheelsets are rotatably mounted in a device, and several sensors are used to detect radial runouts of the shaft centre parts.

From EP 0 228 500 A2 a technical solution for non-contact measurement of a wheelset is known, in which several CCD cameras are in operative connection with a central evaluation unit for image analysis and evaluation. By comparing the recorded images of the wheel profile with pre-stored reference images, qualitative assessments of various geometric parameters are possible.

According to DE 101 02 673 A1, a measuring carriage is moved in parallel to a wheel from a wheelset moved across a measuring section. From the measuring carriage a measuring beam is directed to the wheel running surface of the wheel to be measured. The reflected measuring beam is detected and used to determine the distance to the wheel running surface. Deviations from an ideal contour are calculated and a status profile of the concrete contour is created in relation to the optimal parameters.

Although numerous other technical solutions are known in addition to the above-mentioned references, there continues to be a need for further development with regard to the measurement of geometric parameters on wheelsets, resulting in particular from the safety requirements when using rail vehicles on high-speed railway lines.

SUMMARY

This section provides a general summary of the disclosure, and is not a comprehensive disclosure of its full scope or all of its features.

The task of the invention is to supplement the measuring procedures already known for wheelset machining and wheelset diagnostic systems such that additional geometric parameters can be detected and evaluated. In particular, methods for measuring and calculating the equivalent conicity and the concentricity property of a wheelset should be integrated as new measurement functions. It is assumed here that the concentricity properties of a wheel or wheelset can be evaluated by the possible presence of polygons.

The task is achieved by taking measured values for determining the equivalent conicity, starting from a taping line and at right angles to this taping line on both sides and at respectively the same distance from the taping line, where each measuring point occupies coordinates of the X axis and the Z axis. The acquisition of the measured values is effected by means of the control system available in the wheelset reprofiling machine or the wheelset diagnostic system in the form of a point-by-point scan, and including the profile measurement for the left-hand wheel and the right-hand wheel of the wheelset. Following data acquisition, the measured values taken are evaluated in order to determine whether the left-hand and right-hand machined wheel profile together have a correct angle to the rail nominal profile. The data will continue to be processed by carrying out an interpolation via an algorithm on the original data. Subsequently, the equivalent conicity is calculated and then the measurement results are visualized and stored.

With regard to the determination of the concentricity property (polygon), the task is achieved by the values of the wheel circumference being taken preferably in the taping line, with each measuring point occupying coordinates of the X axis and the C axis. The measured values are taken by means of the control system available in the wheelset reprofiling machine or the wheelset diagnostic system, this is implemented in the form of a point-by-point scan, and including the radial runout measurement for the left-hand wheel and the right-hand wheel of the wheelset. Subsequent to the measured value acquisition, the data taken at the left-hand wheel and at the right-hand wheel of the wheelset are processed further, by filtering them via an algorithm and determining and evaluating the amplitude and the waviness of the polygon. Subsequently, the measurement results reached are visualized and stored.

With the technical solution in accordance with the invention, two methods for measuring and calculating the equivalent conicity as well as the concentricity property of a wheelset are available, which are conceived as additional measuring functions for known wheelset machining systems and wheelset diagnostic systems, irrespective of the actual specific execution of the relevant systems in underfloor, overground or mobile versions. Taking into account in this way additional parameters relating to the geometry of the wheelset, in particular meets current requirements for the safety of high-speed trains.

Here, a particular advantage is that the new functions for data acquisition, calculation, results display and log printouts can be fully implemented in existing control systems. These newly added functions can be optionally activated or deactivated. If these new measurement functions have not been activated, the respective wheelset machining or wheelset diagnostics machine works as normal through the standard functions used so far. If the new measuring functions have been activated, these are available additionally without thereresulting any restrictions with regard to the pre-existing measuring functions.

For the data acquisition with regard to equivalent conicity, values are added within a range of the taping line by means of a program segment that has been extended in relation to the original measuring procedure. Here, the wheelset rotates with a circumferential speed and the spindle drive (Z axis) can be set to different speeds. The scanning is effected by the control system on a point-by-point basis, with each point occupying coordinate data of the X axis and Z axis. The conicity measurement is carried out in a time-optimized manner, and includes a profile measurement.

It is monitored, whether all necessary points have been included in the profile measurement (that is, in the profile-wear measurement, which comprises the conicity measurement), that is, whether the number of measuring points is sufficient. If an error is found, an operator dialogue is initiated, in order to repeat this measurement and/or to diagnose and remedy the fault.

The taping line is determined as the reference point. This point is measured or calculated (if the point needs to be determined by interpolation) during the actual profile and supplementary conicity detection. This is the base point-for the later conicity calculation.

The values of the left-hand wheel and the values of the right-hand wheel are measured. Following data acquisition, the measured values taken are evaluated in order to determine whether the left-hand and right-hand machined wheel profile together have a correct angle to the rail nominal profile. The data taken will continue to be processed and an interpolation is carried out via an algorithm on the original data. Then the equivalent conicity is calculated.

For this purpose, an integral procedure is primarily used, a simplified method in this regard is only intended to be secondary and as a means of checking. For example, the conicity measurement is effected with three values per measurement for a pre-machining measurement and/or a post-machining measurement. Here, the simplified conicity comprises two results, namely respectively for the left-hand and right-hand wheel disc, and the integral conicity comprises one result, namely for both wheel discs.

These measurement results are visualized, at least temporarily stored and documented in a log. The result available in this way is an indicator as to whether or not, the equivalent conicity between the individual wheel or the entire wheelset and the rail, as a travel path of the rail vehicle, is functionally correct.

For the data acquisition for the concentricity property (polygon) wheel circumference values are added preferably in the taping line by means of a program segment that has been extended in relation to the original measurement procedure. The spindle drive (Z axis) can be set to different speeds. The scanning is effected by the control system on a point-by-point basis, with each point occupying coordinate data of the X axis and C axis. These data are used for the later calculation of the radial impact or the polygon of the wheel disc, with the radial runout determination being included in the already available measuring functions; these are supplemented by the polygon measurement. By implementing the polygon measurement, the radial runout measurement is also performed directly with the measured value acquisition, with the same data acquisition being used for both measurements. The measurement of radial runout and polygon determination is carried out in a time-optimized manner.

It is monitored whether the wheel circumference measured corresponds to the wheel diameter measured. This is possible because the diameter measurement is self-sufficient with regard to the polygon measurement. If an error is found, an operator dialogue is initiated, in order to repeat this measurement and/or to diagnose and remedy the fault.

The polygon measurement can be carried out in different variants. Thus, this measurement can be carried out with multi-function probe existing on the wheelset reprofiling machine or on the wheelset diagnostic system, which probe is provided for example for a wear profile measurement or a diameter measurement. Optionally, a polygon measurement is also possible with a synchronous swivelling measuring device, which is designed for example as a separate mechanism for synchronous diameter measurement and slip monitoring. Here, again, two alternatives are possible:

In a first variant, the multi-function probe is initially positioned in the taping line. The synchronous swivelling measuring device is swivelled into its working position. It is to be observed here that the measuring wheel plane and thus the position of the measuring wheel is not situated in the taping line. However, the measuring wheel position must be converted by calculation to the taping line. If the wheelset has extremely worn wheels or wheels run hollow, this may not be possible. If the operator should identify such a condition, the subsequent second variant is to be used with advantage.

Here, the same steps as for the first variant are provided for. However, an additional partial measurement is carried out by means of the multi-function probe in the measuring wheel plane. This is necessary in order to be able to carry out later an exact conversion from the measuring wheel plane to the taping line.

The measured values determined via the X axis and the C axis differ between the start value of the axis and the actual measurement acquisition. Here, the C-axis is not acquired directly in relation to the axle position, but in relation to the respective elbow length. By this means it is possible to offset these measured values either directly during data processing or even at a later point in time.

The data acquired will be filtered and evaluated by an algorithm. The amplitude and waviness of the polygon are determined and is established whether the wheel is within the tolerance required. These measurement results are visualized, at least temporarily stored and documented in a log. The result thus available provides an indication as to whether a wheel features the correct geometric contour or whether there is a polygon or whether there are polygon-type shadings indicating a commencing polygon.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Below, an example design is explained with reference to the drawings. The following is shown:

FIG. 2 shows a section from data acquisition (example only)

FIG. 3 shows a section from additional data acquisition (example only)

DETAILED DESCRIPTION

Figure 1:
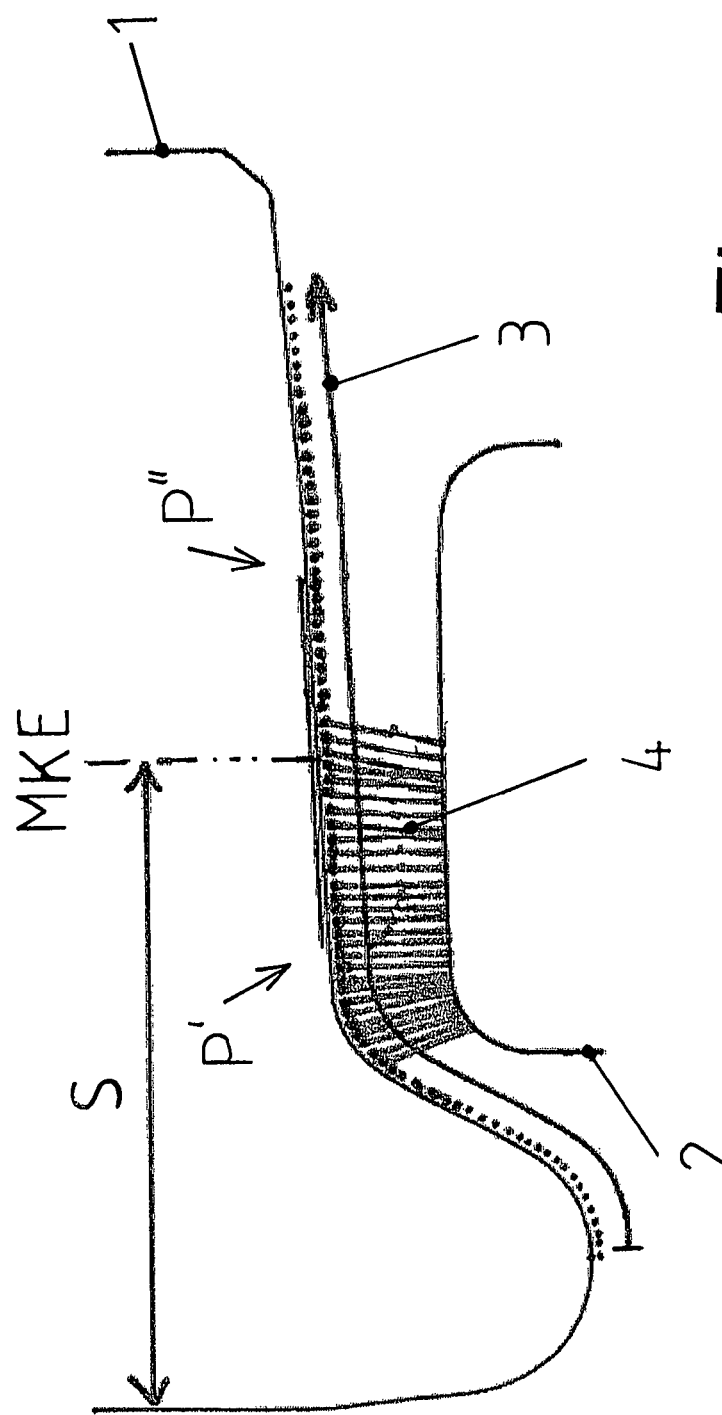
FIG. 1 shows a section from the wheel/rail transitional area

Example embodiments will now be described more fully with reference to the accompanying drawings.

The procedure proposed concerns the measurement and calculation of the geometric parameters of the wheels of a wheelset for rail vehicles. Here, the wheelset is rotatably mounted in a wheelset reprofiling machine or in a wheelset diagnostic system. During a rotating motion of the wheelset measured values for a profile are determined with regard to a profile wear to be detected. Such a sequence is fundamentally known.

However, with regard to the present matter, it is essential that additional parameters are determined beyond what has so far been standard. This concerns the equivalent conicity and the concentricity property, with the latter being possibly evaluable by the possible presence of polygons.

FIG. 1 shows a section from the transitional area between wheel 1 of a wheelset for a rail vehicle and a rail 2 providing the travel path of the rail vehicle. In this illustration, the essential elements for the procedure in accordance with the invention are shown in a stylized fashion.

For determining the equivalent conicity, starting from a taping line MKE, MKE measured values are taken at right angles to the same, along the wheel profile to both sides, and at respectively the same distance to the taping line. This area is stylized with the reference numbers P' and P" in FIG. 1, and the reference number S designates the distance of the taping line MKE from the wheel back.

Each measuring point is determined by coordinates of the X axis and Z axis. The acquisition of these measured values is effected by means of the machine-side control system in the form of a point-by-point scanning, with the known complete profile measurement taking place at the same time. The scanning is respectively started for the left-hand and right-hand wheel 1, for example, at the wheel flange cap and executed to a point behind the taping line MKE. In FIG. 1, the area of a contour measurement of the profile is stylized by means of an arrow with the reference number 3. In the area of reference number 4, in addition to contour measurement, a progressive acquisition of measured values for calculating the equivalent conicity is effected. The point-by-point scanning is effected, for example, at a distance of approximately 0.2 mm from measuring point to measuring point, with e.g. approximately 400 measuring points being acquired. These points are stylized above the arrow with the reference number 3 in the form of separate points.

FIG. 2 shows a section from data acquisition that is an example in this regard. The top numeric designation (751.1104) here designates the coordinate of the taping line MKE on the Z axis. The taping line MKE is determined as the reference point. If, for example, this taping line MKE is 70 mm distant from the wheel back, the Z axis coordinates therefore, as reference point, are 70 mm. This point is the base point for the calculation of the equivalent conicity. The log is designed as a three-column table wherein, starting from the left, the number of the measuring point, the coordinate of the measuring point on the X axis and the coordinate of the measuring point on the Z axis are documented for a wheel 1.

The measured values are acquired, for example, within a range from +/−10 mm to +/−40 mm in relation to the taping line MKE. During measured value acquisition the spindle drive (Z axis) is preferably set to the maximum possible speed, and the wheelset is moved e.g. with a circumferential speed of 5 m×rpm.

The values of the left-hand and right-hand wheel 1 are measured. Following data acquisition, the measured values taken are evaluated in order to determine whether the left-hand and right-hand machined wheel profile together have a correct angle to the rail nominal profile. The data taken will continue to be processed and an interpolation is carried out via an algorithm on the original data. Subsequently, the equivalent conicity is calculated and then the measurement results are visualized and stored.

For determining the concentricity property (polygon) the values of the wheel circumference in taping line MKE are acquired. Here, each measuring point is determined by coordinates of the X axis and the C axis. The acquisition of these measured values is also effected by means of the machine-side control system in the form of a point-by-point scanning, with a known radial runout measurement taking place at the same time. The scanning is carried out for the left-hand and right-hand wheel 1 of the wheelset. The point-by-point scanning is effected, for example, at a distance of approximately 0.5 mm from measuring point to measuring point, with e.g. approximately 720 measuring points being acquired.

FIG. 3 shows a section from data acquisition that is an example in this regard. This is designed as a three-column table wherein, starting from the left, the number of the measuring point, the coordinate of the measuring point on the X axis and the coordinate of the measuring point on the C axis are documented for a wheel 1.

During measured value acquisition the spindle drive (Z axis) is preferably set to the maximum possible speed.

Subsequent to data acquisition a deviation between the start value of the measurement and a following measured value acquisition is found, and the data acquired on the left-hand and right-hand wheel 1 of the wheelset will be processed by filtering the same using an algorithm. The amplitude and the waviness of the polygon are determined and evaluated, with it being possible to state—for example—whether or not wheel 1 is within pre-defined tolerance limits. Then the measurement results are visualized and stored.

The visualization of the measurement results can be designed differently depending on specific user requirements, with a graphical screen display being preferred—for example as a view along the X axis and the C axis or onto the Z axis.

The measurement for determining the concentricity property (polygon) is preferably carried out with a multi-function probe and, if appropriate, additionally by means of a synchronous swivelling measuring device. "Synchronous" here designates a motion in synchronicity with the machining.

If the respective multi-function probe is designed such that it can perform all necessary measurements (X axis and C axis), only one such probe is required.

On the other hand, if the multi-function probe can only acquire the X value, the measured value acquisition of the C axis is effected via a synchronous swivelling measuring device. In this variant, the probe is first positioned in the taping line MKE, and then the synchronous swivelling measuring device is swivelled into working position. The measuring wheel position is converted to the taping line MKE.

Alternatively, an additional partial measurement can be performed by means of the multifunction probe in the measuring wheel plane MRE before the measuring wheel position is converted to the taping line MKE. If a low cycle time is primary (with a poorer measurement result), the measurements can be taken during machining by means of the synchronous swivelling measuring device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A procedure for the measurement and calculation of the geometric parameters of the wheels of a wheelset for rail vehicles, with the wheelset to be assessed being positioned rotatably in a wheelset reprofiling machine or in a wheelset diagnostic system, and with measured values for a profile measurement relating to a profile wear to be detected being determined during a rotating motion, characterized in that for determining the equivalent conicity, starting from a taping line (MKE) and at right angles to this taping line (MKE) on both sides and at respectively the same distance from the taping line (MKE), measured values are acquired where each measuring point occupies coordinates of the X axis and the Z axis, with the measured values being acquired by means of a control system available in the wheelset reprofiling machine or the wheelset diagnostic system in the form of a point-bypoint scan, and including the profile measurement for the left-hand wheel and the right-hand wheel of the wheelset, with the measured values taken being evaluated after data acquisition in order to determine whether the left-hand and right-hand machined wheel profile together have a correct angle to the rail nominal profile and, following measured value acquisition, with the data acquired on the left-hand wheel and on the right-hand wheel of the wheelset being processed further by an interpolation being carried out in relation to an original data by means of an algorithm, and the equivalent conicity then being calculated and subsequently the measurement results being displayed and stored.

2. A procedure for the measurement and calculation of the geometric parameters of the wheels of a wheelset for rail vehicles, with the wheelset to be assessed being positioned rotatably in a wheelset reprofiling machine or in a wheelset diagnostic system, and with measured values for a profile measurement relating to a profile wear to be detected being determined during a rotating motion, characterized in that for determining the concentricity property, the values of the wheel circumference are acquired in the taping line (MKE), with each measuring point occupying coordinates of the X axis and the C axis, with the measured values being acquired by means of a control system available in the wheelset reprofiling machine or the wheelset diagnostic system in the form of a point-bypoint scan, and including the radial runout measurement for the left-hand wheel and the right-hand wheel of the wheelset, and, following the measured value acquisition, the data acquired on the left-hand wheel and on the right-hand wheel of the wheelset are processed further by filtering the same via an algorithm as well as determining and evaluating the amplitude and the waviness of the polygon, and subsequently displaying and storing the measurement results.

3. The procedure according to claim 1 characterized in that during measured value acquisition the spindle drive (Z axis) is set to the maximum possible speed, and the wheelset is moved e.g. with a circumferential speed of 5 m×rpm.

4. The procedure according to claim 2 characterized in that during measured value acquisition the spindle drive (Z axis) is set to the maximum possible speed.

5. The procedure according to claim 1 characterized in that the data acquired on the left-hand wheel and on the right-hand wheel of the wheelset are evaluated in order to determine whether the respective wheel is within pre-defined tolerance limits.

6. The procedure according to claim 1 characterized in that a machining strategy for automatically changing the machining parameters by the wheelset reprofiling machine is derived from the measurement results.

7. The procedure according to claim 2 wherein the data acquired on the left-hand wheel and on the right-hand wheel of the wheelset are evaluated in order to determine whether the respective wheel is within pre-defined tolerance limits.

8. The procedure according to claim 2 wherein a machining strategy for automatically changing the machining parameters by the wheelset reprofiling machine is derived from the measurement results.

* * * * *